United States Patent [19]
Janssens

[11] Patent Number: 5,972,494
[45] Date of Patent: Oct. 26, 1999

[54] FILLED FLUOROPOLYMER COMPOSITION FOR CORROSION RESISTANCE

[75] Inventor: Ruth Janssens, Hofstade, Belgium

[73] Assignee: E. I. du Pont de Nemours and Company, Wilmington, Del.

[21] Appl. No.: 08/960,691

[22] Filed: Oct. 29, 1997

Related U.S. Application Data

[60] Provisional application No. 60/030,123, Nov. 1, 1996.

[51] Int. Cl.⁶ .......................... B32B 27/06; B32B 27/20; B32B 27/28; B32B 31/26
[52] U.S. Cl. .......................... 428/324; 428/323; 428/331; 428/332; 428/363; 428/421; 428/422; 427/375; 427/384; 427/385.5; 427/407.1; 106/14.05; 106/415; 106/469
[58] Field of Search ................................. 428/323, 324, 428/331, 332, 363, 421, 422; 427/372.2, 375, 384, 385.5, 407.1; 106/14.05, 415, 469

[56] References Cited

U.S. PATENT DOCUMENTS

| 3,087,827 | 4/1963 | Klenke et al. | 106/291 |
|---|---|---|---|
| 3,087,828 | 4/1963 | Linton et al. | 106/291 |
| 3,087,829 | 4/1963 | Linton et al. | 106/291 |
| 4,353,950 | 10/1982 | Vassiliou | 428/195 |
| 4,557,977 | 12/1985 | Memmer et al. | 428/421 |
| 5,204,168 | 4/1993 | Rota et al. | 428/216 |
| 5,434,001 | 7/1995 | Yamada et al. | 428/335 |
| 5,558,908 | 9/1996 | Lukacs, III et al. | 427/228 |

FOREIGN PATENT DOCUMENTS 4-229246  8/1992  Japan.

*Primary Examiner*—Vivian Chen

[57] ABSTRACT

Compositions of fluoropolymer containing a first filler component such as mica and a second filler component such as talc are resistant to permeation by water and aqueous acid and provide useful coatings for such items as chemical equipment. The composition can be used as coatings which can be applied by electrostatic spray of dry powder.

20 Claims, No Drawings

FILLED FLUOROPOLYMER COMPOSITION FOR CORROSION RESISTANCE

RELATED APPLICATIONS

This application claims the benefit of Provisional Application Ser. No. 60/030,123, filed Nov. 1, 1996.

FIELD OF THE INVENTION

The instant invention relates to an improved fluoropolymer composition containing fillers which can be used as a coating on a substrate to provide for corrosion resistance upon exposure of the substrate to a variety of chemicals typically encountered in the chemical processing industry.

BACKGROUND OF THE INVENTION

Fluorinated polymers are not degraded when exposed to chemical systems commonly encountered in chemical processes and therefore have been used to coat chemical processing equipment. In general fluorinated polymers are inert to strong mineral acids, inorganic bases, inorganic oxidizing agents and salt solutions. Such fluoropolymers are also inert to organic compounds such as organic acids, anhydrides, aromatics, aliphatic hydrocarbons, alcohols, aldehydes, ketones, esters, chlorocarbons, fluorocarbons, and mixtures of these organic compounds.

However, in order to be effective against corrosion such fluoropolymer coatings need to exhibit (1) good wet adhesion and (2) low water (solvent)/oxygen permeability. By good wet adhesion is meant the adhesion of the polymer film to a substrate in the presence of water (solvent). By low water (solvent) and oxygen permeability is meant the ability to retard water (solvent) and oxygen permeation through the polymer film to the underlying substrate, usually metal. Ways to improve the corrosion resistance of fluoropolymer coatings have been desired.

Films of various fluoropolymers which can have various fillers including mica, are used for cladding metal substrates in Japanese Kokai 4-229246, Sahara et al. (1992). There is no focus in this Kokai on minimizing permeation or on using mica in fluoropolymers such as PFA, or on what proportions would be needed or on improving the wettability of the fluoropolymer by adding a second filler material.

Mica coated with oxides to produce sparkling optical effects is the subject of U.S. Pat. No. 3,087,829, Linton (1963).

Mica is used in fluoropolymer coatings for cookware to minimize stain formation, as in U.S. Pat. No. 4,353,950, Vassiliou (1982).

Metal laminates which have been precoated with powder base paints having various additives and fillers such as mica have been disclosed in U.S. Pat. No. 5,204,168. There is no recognition of the combination of a second filler with the mica to improve wettability of a fluoropolymer coating.

The need remains for a composition suitable for coating processing equipment which meets the chemical process industry requirements for good corrosion resistance, high temperature resistance, and good chemical inertness.

SUMMARY OF THE INVENTION

The present invention provides for corrosion resistant coating compositions with high temperature resistance and chemical inertness for application to the surfaces of substrates exposed to harsh chemical environments. The coatings have both improved wet adhesion and low water/oxygen permeability and maintain these performance characteristics over protracted periods of use.

More specifically the present invention provides a composition suitable as a corrosion resistant coating on a substrate comprising a fluoropolymer component, a first filler component and a second filler component wherein:

(a) the first filler component is a platelet shaped particle which forms a mechanical barrier against permeation of water, solvent and oxygen to the substrate and is present in the amounts of about from 2 to about 15% by weight based on the total weight of the composition, and (b) the second filler component is a platelet shaped mineral particle which improves wettability and is present in the amounts of about from 0.5 to about 15% by weight based on the total weight of the composition.

The improvement in wettability provided by the second filler component is critical to the operability of the composition in providing smooth coatings having low permeability. The presence of the second filler component enables the fluoropolymer component and first filler to be uniformly applied to the substrate, so that the first filler, bound together by fluoropolymer in the ultimate coating is uniformly available to provide impermeability for the coating. The coating composition is preferably applied to the substrate by electrostatic spraying of a previously dry mixed composition. The presence of the second filler component promotes the uniformity of the dry mix to provide the opportunity for the application of a uniform composition to the substrate. When applied by electrostatic spraying, the particles of the fluoropolymer and first filler component tend to repel one another, apparently resulting from being charged differently by the sprayer (electrostatic gun). Without the presence of the second filler component in the composition, the spray cloud has the appearance of concentration of white fluoropolymer particles forming the periphery of the spray cloud and a central region of colored particles, the color depending on the color of the particles of first filler component. The effect of this non-uniformity of the composition in the spray cloud is that the composition applied to the overall substrate is non-uniform, leaving some regions "starved" of first filler component so as to be more susceptible to corrosion than other regions, rather than being uniformly corrosion resistant (water/oxygen impermeable). The presence of the second filler component provides a uniform spray cloud composition, i.e., separation of the composition into components is no longer visible.

These attributes imparted to the composition by the second filler component are considered collectively as improving the wettability of the fluoropolymer with respect to the first filler component, i.e., these components associate with one another during pre-spray mixing and spray application, rather than dissociate as occurs in the absence of the second filler component.

Of particular interest is a composition of a melt fabricable fluoropolymer containing 4 to 10% by weight of the total composition of a first filler component which is mica and 0.5 to 8% by weight of the total composition of a second filler component which is talc.

DETAILED DESCRIPTION

Preparation of the fluoropolymer composition of the present invention is well known in this art. The fluoropolymer component is preferably a melt fabricable fluoropolymer. Melt fabricable fluoropolymers include tetrafluoroethylene (TFE) copolymers with one or more comonomers such as ethylene to form ETFE or perfluoroolefin, notably hexafluoropropylene (HFP) or perfluoro(alkyl vinyl) ether (PAVE), where the alkyl group contains 1 to 5 carbon atoms, with perfluoro(ethyl vinyl) ether(PEVE) and perfluoro (propyl vinyl) ether (PPVE) being preferred.

The molecular weight of the melt-fabricable tetrafluoroethylene copolymers is unimportant except that they be sufficient to be film forming and be able to sustain a molded shape so as to have integrity in the coating application. Typically the melt viscosity of FEP (TFE/HFP) and PFA (TFE/PAVE) will be at least $1\times10^2$ Pa•s and may range up to $60-100\times10^3$ Pa•s as determined at 372° C. according to ASTM D-1238.

While the fluoropolymer component is preferably melt fabricable, polytetrafluoroethylene (PTFE) and modified PTFE which are not melt fabricable may be used. By modified PTFE is meant PTFE containing a small amount of comonomer modifier which improves film forming capability during baking (fusing), such as perfluoroolefin, notably hexafluoropropylene (HFP) or perfluoro(alkyl vinyl) ether (PAVE), where the alkyl group contains 1 to 5 carbon atoms, with perfluoro(ethyl vinyl) ether (PEVE) and perfluoro (propyl vinyl) ether (PPVE) being preferred. The amount of such modifier will be insufficient to confer melt fabricability to the PTFE, generally no more than 0.5 mole %. The PTFE, also for simplicity, can have a single melt viscosity, usually at least $1\times10^9$ Pa•s, but a mixture of PTFE's having different melt viscosities can be used to form the fluoropolymer component.

Other suitable fluoropolymers that may be used in this invention include vinyl and vinylidene fluoride polymers and copolymers and chlorotrifluoroethylene polymers and copolymers, notably ECTFE and PCTFE.

The first filler component applicable to this invention is a platelet shape particle. The platelet shape particles are dry mixed with the fluoropolymer component as described above. The particles form a mechanical barrier against permeation of water, solvent and oxygen. Electrostatic application (charging the particles) of a powder coating composition containing fluoropolymer and the platelet shape fillers to a substrate causes the platelets to align parallel to the surface of the substrate. Since oxygen, solvent and water can not pass through the particles themselves, the presence of aligned particles substantially reduces the rate of permeation through the polymer film which is formed.

The platelet shape particles of the first filler component are typically mica particles, including mica particles coated with an oxide layer like iron or titanium oxide. These particles have an average particle size of about 10 to 200 microns, preferably 20–100 microns, with no more than 50% of the particles of flake having average particle size of more than about 300 microns. The mica particles coated with oxide layer are those described in U.S. Pat. No. 3,087,827 (Klenke and Stratton); U.S. Pat. No. 3,087,828 (Linton); and U.S. Pat. No. 3,087,829 (Linton); the disclosure of which is hereby incorporated by reference.

The micas described in these patents are coated with oxides or hydrous oxides of titanium, zirconium, aluminum, zinc, antimony, tin, iron, copper, nickel, cobalt, chromium, or vanadium. As will be further explained, iron oxide coated mica has been found to be particularly useful for ease of application, minimized bubbling, and good corrosion resistance. Mixtures of coated micas can also be used. The mica or coated mica is ordinarily present in the composition of the invention in an amount which is effective to provide at least 460 hours of corrosion resistance by the test described hereinafter. Concentration of about 2 to 15% by weight of first filler component such as mica based on the total weight of the composition and preferably from 4 to 10% by weight based on the total weight of the composition will generally provide this corrosion resistance.

The second filler component applicable to this invention also is a platelet shape particle but is selected because of its ability to improve the wettability of the composition. It has been found that with certain fluoropolymers, in particular PFA, low surface tension of the polymer makes it difficult to wet, i.e., to mix the fluoropolymer material with other substances. Particularly useful as the second filler component in this invention is a mineral filler, such as talc (magnesium silicate, $3Mgo.4SiO_2.H_2O$ and/or magnesium carbonate $MgCO_3$), which is also dry mixed with the fluoropolymer component and aids in the uniform distribution of the first filler component (mica) throughout the fluoropolymer powder both during dry mixing and spraying.

By the term talc is meant any number of soft minerals derived from metamorphic rock which may be referred to as talcum, soapstone, rensselaerite, potstone, magnesite, steatite, or French chalk. These particles have an average particle size of about from 2 to 20 microns. Of particular use is hydrated magnesium silicate sold under the name of Microtalc IT extra, manufactured by Norwegian Talc which is micronized and of extremely high purity. The talc or other second filler component is ordinarily present in the composition of the invention in an effective amount to promote uniformity of the mixture of fluoropolymer and first filler component (particles) being applied to the substrate being coated by the composition. The amount of second filler component such as talc used should also be less than the amount which causes bubbling of the coating. Concentration of about 0.5 to 15% by weight of the second filler component based on the total weight of the composition and preferably from 0.5 to 8% by weight based on the total weight of the composition will provide this result.

Both filler components are heat resistant, i.e., do not disintegrate or discolor either upon baking of the composition coated on the substrate, such as at 360° C., or in continuous use of the coated substrate at temperatures up to 260° C.

To further improve the wettability of the coating composition of this invention, other flow agents are optionally added to the fluoropolymer composition such as amorphous silica (Sylloid 244FP, manufactured by W.R. Grace) or nonionic fluorochemical (Fluorad FC-430, manufactured by 3M Company).

The filled fluoropolymer composition of the present invention has been found to be especially effective when applied as a topcoat over a primer composition. The primer composition may include either melt fabricable or non melt fabricable fluoropolymer as described above in addition to a binder resin. The binder component is composed of polymer which is film-forming upon heating to fusion and is also thermally stable and has a sustained temperature use of at least 140° C. This component is well known in application of non-stick finishes for adhering fluoropolymer to substrates and for film-forming. The binder is generally non-fluorine containing and yet adheres to fluoropolymer. Examples of such polymers include one or more polysulfones, which are amorphous thermoplastic polymers with a glass transition temperature of about 185° C. and a sustained service temperature of about 140° C. to 160° C., polyethersulfones, which are amorphous thermoplastic polymers with a glass transition temperature of about 230°

C. and a sustained temperature service of about 170° C. to 190° C., polyphenylene sulfides, which are partially crystalline polymers with a melting temperature of about 280° C. and a sustained temperature service of about 200° C. to 240° C., and polyimides, which crosslink upon heating of the coating to fuse it which have a sustained service temperature in excess of 250° C. All of these polymers are thermally stable and dimensionally stable at temperatures within their sustained service range and below, and they are wear resistant. They also adhere well to clean metal surfaces. Polyimides and/or polyamideimides have been found to especially useful due to their ability to confer excellent abrasion resistance and thermal resistance to the composition.

The proportion of fluoropolymer powder and binder in primer compositions used in the present invention may vary but are preferably in the weight ratio of from 10 to 30 by weight. Any method of blending the fluoropolymer and binder may be used which achieves an intimate mixture of the components. Typically an organic liquid will be used as the blending medium and the binder may dissolve in the particular liquid (solvent) chosen. If not dissolved, the binder polymer should be finely divided which may require the polymer to be milled either before or during the blending. The resultant coating composition will have the filled fluoropolymer particles dispersed in the liquid medium and the binder polymer either dispersed in the medium as finely divided particles or dissolved in the liquid medium to give the intimate mixture of the polymers desired.

The organic liquid will depend on the identity of the binder polymer and whether a solution or dispersion thereof is desired. Examples of such liquids include N-methylpyrolidone, butyrolactone, and high boiling aromatic solvents and alcohols and the amount used will depend on the flow characteristics desired for the particular coating operation.

The compositions of the topcoat and the primer of the present invention may also optionally contain other additives such as pigments for the purpose of improving or adjusting the appearance of the composition. It has also been found particularly useful that the fluoropolymer topcoat contain a stabilizing metal, e.g., tin, such as that provided in commercially available PFA, type 350, product code 532-5450 manufactured by the DuPont Company. Tin stabilizes against thermal degradation, blistering and bubbling.

The compositions of the present invention are typically applied in powder form by electrostatic spraying using a flat jet nozzle spray gun such as made by Gema Company of Switzerland. The compositions are typically applied to cleaned and degreased substrates which have preferably been treated by conventional treatment such as grit blasting, etching, or primer treatment, in order to aid adhesion of the coating to the substrate. While any suitable substrate can be coated, examples of typical metal substrates include steel, including carbon steel, and aluminum, among others. The coated substrate can be used as a chemical container, chemical reaction or corrosion resistant component thereof.

The powder coating is typically applied to heated substrates as will be more fully described in the examples below. When applying the coating, it is desirable to minimize a phenomenon known as bubbling of the coating. Bubbling most likely occurs because of entrapped air. As the particles are applied, partial displacement of air between the particles occur. However, release of air will be retarded or partly prevented, as the applied powder begins to melt on the substrate at the air interface to form a continuous layer. Furthermore, air or vapor trapped within the powder particles raise the melt viscosity and interfere with particle flow. It has been observed that when the applied coating exceeds a certain thickness, bubbling occurs. When air bubbles reach the air interface during stoving, pinholes result. A relationship exists between the barrier capacity of the filler, the melt viscosity, the flow time, the stoving temperature and critical film thickness. It has been found that when the total DFT (dry film thickness) of the coating and especially the thickness per layer is controlled, no bubbling occurs. Total DFT for this system is preferably at least 160 micrometers and less than 500 micrometers, preferably less than 400 to 450 micrometers and provided in multiple (at least two) coats. The recommended DFT per layer is between about 80 and 120 micrometers per layer. DFT is the thickness of the layer after baking of the layer (heating above the melting temperature of the fluoropolymer to cause the layer of sprayed particles to coalesce (melting of the layer) into an impermeable layer).

When applying the powder coating it is also desirable to minimize a phenomenon known as repulsion. As a sprayed powder layer grows in thickness, the potential across the thickness of the coating increases as a result of the accumulation of charged particles and ions at the coated surface. Repulsion can create surface defects such as pinholes and craters.

CORROSION RESISTANCE (TEST METHOD)

Water vapor resistance of a coated substrate was tested in a conventional Atlas Cell using ASTM method C868. In accordance with this test, coated substrates were exposed to the liquid-gas interface of a solution media of 0.05 M HCl in deionized water at 98° C. until the coating shows defects such as blistering, bubbling, lack of adhesion etc. Some discoloration of the coating may occur, which may only reflect attack of the acid on the surface of the mica in the coating, but without the acid penetrating through the entire thickness of the coating to reach and corrode the substrate. When the solution permeates through the entire thickness of the coating and contacts the surface, this is indicated by one or more of the above-mentioned defects in the coating. The resultant contact of the acid solution with the substrate leads to corrosion of the substrate. Corrosion Resistance of the coated substrate (by the test described above) desired by the Chemical Processing Industry results is greater than 460 hours and preferably greater than 720 hours before any of these defects in the coating occur which would lead to corrosion of the substrate.

EXAMPLES

To demonstrate these effects, coating materials were made and tested. Parts, proportions and percentages herein are by weight except where otherwise indicated.

The properties of the fluoropolymer component used for the various examples are listed below in Table 1. The fluoropolymer component is PFA, type 350, product code 532-5450 manufactured by the DuPont Company. This type PFA is stabilized with tin against thermal degradation, blistering and bubbling.

TABLE 1

PFA

| Properties | Value |
| --- | --- |
| Melt flow rate | 2.0–4.0 g/10 min |
| Specific gravity | 2.15 |
| Melting point | 305–310° C. |
| Continuous service temperature | 260° C. |
| PPVE content | 2.9–3.6% wt |
| Flash-point | >200° C. |

The primer composition used for the examples below is a solvent based composition of FEP, PAI and PES, product code 420-703 manufactured by the DuPont Company. The composition of the primer material is given in Table 2.

TABLE 2

PRIMER COMPOSITION-wt %

| | |
| --- | --- |
| Pigments | 1.0 |
| Filler (Barium sulphate) | 7.9 |
| Amide imide polymer | 1.0 |
| Polyethersulphone | 6.8 |
| Polyacrylate | 0.7 |
| FEP | 11.1 |
| N-Methyl-2-pyrolidone | 52.5 |
| VM-Naptha | 0.6 |
| N-Butyl alcohol | 0.16 |
| Diacetone alcohol | 1.9 |
| Methylisobutylketone | 16.4 |

Procedure for sample preparation: A substrate of carbon steel was roughened by grit blasting with aluminum oxide to achieve a surface roughness Ra of about 75 to about 125 micrometers using a coarse grit (10–20 mesh) and 90–100 psi (0.62–0.69 MPa) air pressure. The primer described above in Table 2 was applied wet by conventional methods to a film thickness of about 5 to 8 micrometers, so that the primer just masks the blasted surface.

A first layer of fluoropolymer powder coating was applied electrostatically to the wet primer using a powder spray gun supplied by GEMA Company. For unfilled polymer, Example 1, round deflector nozzle PG1 was used. For the remaining examples, which all used filled fluoropolymer, flat jet nozzle PGC1 was used. Gun settings for all examples were 15 kV, 3.0 conveying air, 10 dosing air and 6 bar pressure. The first coating layer was applied onto the wet primer and a thermocouple was attached to the coated substrate. The coated substrate was heated in an oven at maximum temperature of 355° C. While heating, the temperature of the substrate was measured with the thermocouple and the coated substrate was baked for 10 minutes above the thermocoupled temperature of 340° C. The substrate was removed the oven and the second and subsequent layers were applied. Each layer was applied from about 80 to about 120 microns DFT per coat. The coated substrate was then baked for 10 minutes above the thermocoupled temperature of 340° C. The baking time can be extended if desired to insure complete melting and coalescence of the coating. The substrate was coated repeatedly with the fluoropolymer coating composition until the desired DFT was reached, typically in the range of 250 to 400.

Examples 1–7 Mixtures of PFA with Filler

Mixtures of PFA with selected fillers described above were tested. Table 3 lists the identity and characteristics of the various fillers that were tested. These fillers were dry mixed with the fluoropolymer component PFA described in Table 1. The fillers were selected because of their platelet shape, their chemical inertness and their high temperature resistance (compatible with the continuous service temperature of PFA, 260° C.).

TABLE 3

FILLERS

| Filler | Supplier | Composition | Density | Average Particle Size (μm) |
| --- | --- | --- | --- | --- |
| Iriodin ® 153 | Merck | Mica coated with TiO$_2$ | 2.79 | 30–100 |
| Microtalc ® IT extra | Norwegian talc | Talc hydrated Mg-silicate | 2.72 | <20 |
| EM 141107 | Merck | Mica coated with ZnO/S | 3.09 | 30–100 |
| Iriodin ® 504 red | Merck | Mica coated with Fe$_2$O$_3$ | 3.30 | 10–60 |
| Plastorit ® | Naintch | Mg—Al—Si hydrate | 2.75 | <80 |
| EM 1405372 | Merck | Conductive mica | | <15 |
| Irionor ® P | CMMP | Fe$_2$O$_3$ mica | 4.70 | |

Table 4 lists the compositions and the results of the Atlas Cell Tests for the compositions containing various fillers tested.

TABLE 4

| Sample | Filler Composition | Remarks | DFT Total (μm) | Atlas Cell Results |
|---|---|---|---|---|
| 1 | None (PFA only) | •loss of adhesion | 500 μm ?4 layers | <168 hours |
| 2 | 10% mica coated with TiO₂ Iriodin 153 | •bubbles at DFT > 300 μm •difficult to mix dry with PFA | 313 μm 4 layers | <264 hours |
| 3 | 10% mica coated with Fe₂O₃ Iriodin 504 | •clear separation of the different particles of the powder during gun-application •no uniform layer formed on the plate, both components present in separate layers | 405 μm 4 layers | >624 hours |
| 4 | 10% crystalline Fe₂O₃ mica Ironor P | rough surface | 320 μm 4 layers | <264 hours |
| 5 | 10% conductive mica EM-1405372 | •quick appearance of repulsion •good flow, smooth surface | 393 μm 4 layers | <144 hours |
| 6 | 10% mica coated with ZnO EM 141407 | •problem of bubbling | 323 μm 3 layers | <144 hours |
| 7 | 10% hydrated talc Microtalc IT extra | •easy to mix with PFA dry •very smooth surface after application •quick bubbling when total DFT >350 μm, DFT around 300 μm was no problem | 277 μm 3 layers | >624 hours |

Examples 3 (iron oxide coated mica in PFA) and Example 7 (microtalc in PFA) successfully passed the corrosion resistance requirement. However, bubbling was noted as a concern when microtalc alone in PFA was used (Example 7) and separation (non uniform mixing of components) of components was observed when mica alone in PFA was used (Example 3). The practice of the system of Example 3 using larger substrates than the 22 cm² substrates tested in the Atlas Cell gives non-uniformity in the distribution of the mica across the substrate surface, leading to coating regions of reduced corrosion resistance.

Examples 8–11 Mixtures of PFA, Filler and Flow Agent

Mixtures of PFA with selected fillers described above and with flow agents were tested. The flow agent used was either amorphous silica sold as Sylloid 244FP manufactured by W.R. Grace or nonionic fluorochemical sold as FC-430 manufactured by the 3M Company.

Table 5 lists the compositions and the results of the Atlas Cell Tests for the compositions containing fillers and flow agents tested.

TABLE 5

| Sample | Filler Composition | Remarks | DFT Total (μm) | Atlas Cell Results |
|---|---|---|---|---|
| 8 | 8% iron-oxide coated mica 2% FC430 fluororad | •Agglomerates of powder formed •Separation of components | 507 4 layers | <400 hours |
| 9 | 8% iron-oxide coated mica 2% Sylloid 244FP | With increasing flow agent: •Sprayability increased •Better flow •Loss of adhesion | 396 4 layers | 720 hours |
| 10 | 8% iron-oxide coated mica 0.2% Sylloid 244FP | •Lower gloss •Loss of adhesion | 390 4 layers | 720 hours |
| 11 | 8% iron-oxide coated mica 2% microtalc | •No separation during application •Uniform distribution of components on the plate •Good flow | 350 4 layers | >720 hours |

Mixtures of PFA with mica and talc and optionally flow agent of amorphous silica performed well.

Examples 12–16 Optimization

Mixtures of PFA with selected fillers described above and with flow agents were tested. The purpose of these experiments was to optimize the amounts of mica and talc to be added to the fluoropolymer component to reduce both separation and bubbling when combining mica and talc. The total amount of filler was maintained constant (i.e., 10 weight percent), while the individual amounts of mica and talc were varied.

Table 6 lists the compositions and the results of the Atlas Cell Tests for the compositions containing fillers and flow agents tested.

TABLE 6

| Sample | Filler Composition | Remarks | DFT Total (μm) | Atlas Cell Results |
|---|---|---|---|---|
| 12 | 9.5% iron-oxide mica 0.5% microtalc | No clear spray difference noticed with the mixture without any talc | | |
| 13 | 9.0% iron-oxide mica 1.0% microtalc | see below | 320 4 layers | >720 hours |
| 14 | 8.5% iron-oxide mica 1.5% microtalc | see below | 320 4 layers | >720 hours |
| 15 | 8.0% iron-oxide mica 2.0% microtalc | see below | 266 3 layers | >720 hours |
| 16 | 8% iron-oxide mica 1.8% microtalc 0.2% Sylloid 244FP | very good flow | 340 4 layers | >720 hours |

Atlas Cell test results of these examples were similar. The more talc the mixture contained, the less the separation of the different components was visible and the smoother the surface of the coating after baking. As little as 0.5% micro talc provides improvement in separation (less separation) when less mica is used.

Examples 17–19 Application Conditions

Mixtures of PFA with mica and talc and optionally flow agent were applied at varying times and temperatures. Two different baking temperatures of 350° C. and 370° C. oven temperature were tested. Baking time was 10 and 20 minutes above 340° C. thermocouple temperature. These extremes in temperature conditions were selected to investigate the influence of baking temperature on bubbling. The coating compositions were applied until repulsion or bubbling occurred (as defined above).

Table 7 lists the compositions, application conditions and results of varying baking times.

TABLE 7

| Sample | Filler Composition | Application Conditions | Results |
|---|---|---|---|
| 17 | 5.0% iron-oxide mica 2.0% microtalc | 370° C. oven temperature: 10 min above 340° C. | DFT 500 μm (5 layers) before dense bubbling |
| | | 20 min above 340° C. | DFT 400 μm (3 layers) before dense bubbling |
| | | 355° C. oven temperature: 10 min above 340° C. | DFT 528 μm (5 layers) no bubbling occurred medium bubbling after a post bake of 15 min |
| | | 20 min above 340° C. | DFT 415 μm (4 layers) before medium bubbling |
| 18 | 9.0% iron-oxide mica 1.0% microtalc | 370° C. oven temperature: 10 min above 340° C. | DFT 515 μm (5 layers) before bubbling |
| | | 20 min above 340° C. | DFT 468 μm (4 layers) before bubbling |
| | | 355° C. oven temperature: 10 min above 340° C. | DFT 507 μm (5 layers) no bubbling occurred bubbling after a post bake of 25 min |
| | | 20 min above 340° C. | DFT 541 μm (5 layers) before some bubbling |
| 19 | 9.0% iron-oxide mica 1.0% microtalc 0.2% amorphous silica | 355° C. oven temperature: 10 min above 340° C. | DFT 460 μm (5 layers) no bubbling occurred medium bubbling after a post bake of 25 min |
| | | 20 min above 340° C. | DFT 472 um (5 layers) medium bubbling occurred |

As a result of these tests, preferred application conditions were maximum DFT 400–450 micrometers, not more than four layers with a thickness of approximately 100 micrometers per layer, and baking conditions of 355° C. oven temperature with a baking time of 10 minutes above 340° C. thermocouple temperature.

Long exposures of the coating to the acid solution in the Atlas Cell test frequently discolors the coating without corroding the substrate. To prevent this discoloration, it was found that the application of a thin layer (approximately 20 micrometers) of unfilled overcoat of fluoropolymer on top of the filled layers of fluoropolymer resulted in eliminating discoloration.

The following is claimed:

1. A composition for use as a corrosion resistant coating on a substrate comprising a fluoropolymer component, a first filler component and a second filler component wherein:
   (a) the first filler component comprises a platelet shaped particle which forms a mechanical barrier against permeation of water, solvent and oxygen to the substrate and is present in the amounts of about from 2 to about 15% by weight based on the total weight of the composition, and
   (b) the second filler component comprises a platelet shaped mineral particle which improves wettability and is present in the amounts of about from 0.5 to about 15% by weight based on the total weight of the composition.

2. The composition of claim 1 wherein the first filler component comprises mica.

3. The composition of claim 2 wherein the second filler component comprises talc.

4. The composition of claim 1 wherein the second filler component is talc.

5. The composition of claim 1 wherein the fluoropolymer component is melt fabricable.

6. The composition of claim 5 wherein the fluoropolymer component comprises tetrafluoroethylene/perfluoro(alkyl vinyl ether) copolymer.

7. The composition of claim 1 which further comprises a flow agent.

8. The composition of claim 7 wherein the flow agent comprises amorphous silica.

9. The composition of claim 1 in the form of a dry powder mixture suitable for electrostatic spraying.

10. The composition of claim 1 in the form of a baked film with a thickness of at least about 160 micrometers, said film being present as a coating on a substrate and exhibiting Corrosion Resistance greater than 460 hours.

11. The composition of claim 1 in the form of a baked film with a thickness of less than about 500 micrometers, said film being present as a coating on a substrate and exhibiting Corrosion Resistance greater than 460 hours.

12. A process of coating a substrate with a permeation resistant composition, the process comprising the steps of:
   coating the substrate with at least one primer comprising at least one melt fluoropolymer,
   applying at least two layers comprising the composition of claim 1 onto the primed substrate,
   heating the coated substrate to a temperature under conditions sufficient to melt the layers, wherein the total thickness of the layers applied to the substrate range of less than about 500 micrometers in thickness.

13. The process of claim 12 in which said heating after each application is performed for at least about 10 minutes at a temperature of about 340° C.

14. The process of claim 12 wherein said at least two layers comprising tetrafluoroethylene/perfluoro(alkyl vinyl ether) copolymer and mica and talc is applied by an electrostatic spray process upon the primed substrate.

15. The process of claim 14 wherein at least three layers comprising tetrafluoroethylene/perfluoro(alkyl vinyl ether) copolymer and mica and talc are applied upon the primed substrate.

16. The process of claim 12 wherein said at least two layers of tetrafluoroethylene/perfluoro(alkyl vinyl ether) copolymer and mica and talc is applied to the primed substrate in the form of dry powder.

17. A coated substrate produced by the process of claim 12.

18. A substrate coated with the composition of claim 1.

19. The substrate of claim 18 and an overcoat of fluoropolymer.

20. A coated substrate comprising:
   (a) a substrate,
   (b) a primer comprising fluoropolymer and one or more adhesion promoting polymers, said primer being coated on said substrate, and
   (c) at least two layers comprising the composition of claim 1 on said primer.

* * * * *